United States Patent [19]

Jarret et al.

[11] 4,175,733

[45] Nov. 27, 1979

[54] HYDRAULIC INERTIA FILLED SPRING

[76] Inventors: Jacques H. Jarret, 32 allée des Soudanes, 78430 Louveciennes; Jean M. B. Jarret, 30, avenue Raphaël, 75016 Paris, both of France

[21] Appl. No.: 900,869

[22] Filed: Apr. 28, 1978

[30] Foreign Application Priority Data

May 5, 1977 [FR] France .................. 77 13691

[51] Int. Cl.² .............................................. F16F 9/22
[52] U.S. Cl. ...................................... 267/126; 92/134
[58] Field of Search ............ 92/85 B, 134; 123/46 R, 123/46 B, 51 R, 51 B, 192 B, 192 R, 65 R, 65 C, 65 D; 267/118, 119, 121, 124, 126; 417/491

[56] References Cited

U.S. PATENT DOCUMENTS

| | | | |
|---|---|---|---|
| 2,193,736 | 3/1940 | Onions | 92/134 X |
| 3,237,726 | 3/1966 | Deyerling | 267/126 X |
| 3,694,111 | 9/1972 | Braun | 267/124 X |

*Primary Examiner*—Duane A. Reger
*Attorney, Agent, or Firm*—Browdy and Neimark

[57] ABSTRACT

The hydraulic spring comprises a fixed part innerly provided with an axial bore communicating with a reservoir of liquid and having an outlet aperture, a moving part filled with liquid, surrounding the fixed part and provided with an inside recess. The inside recess of the moving part is substantially in front of the outlet aperture of the fixed part at position of outer dead center and substantially in front of the free end of the fixed part at position of inner dead center.

6 Claims, 2 Drawing Figures

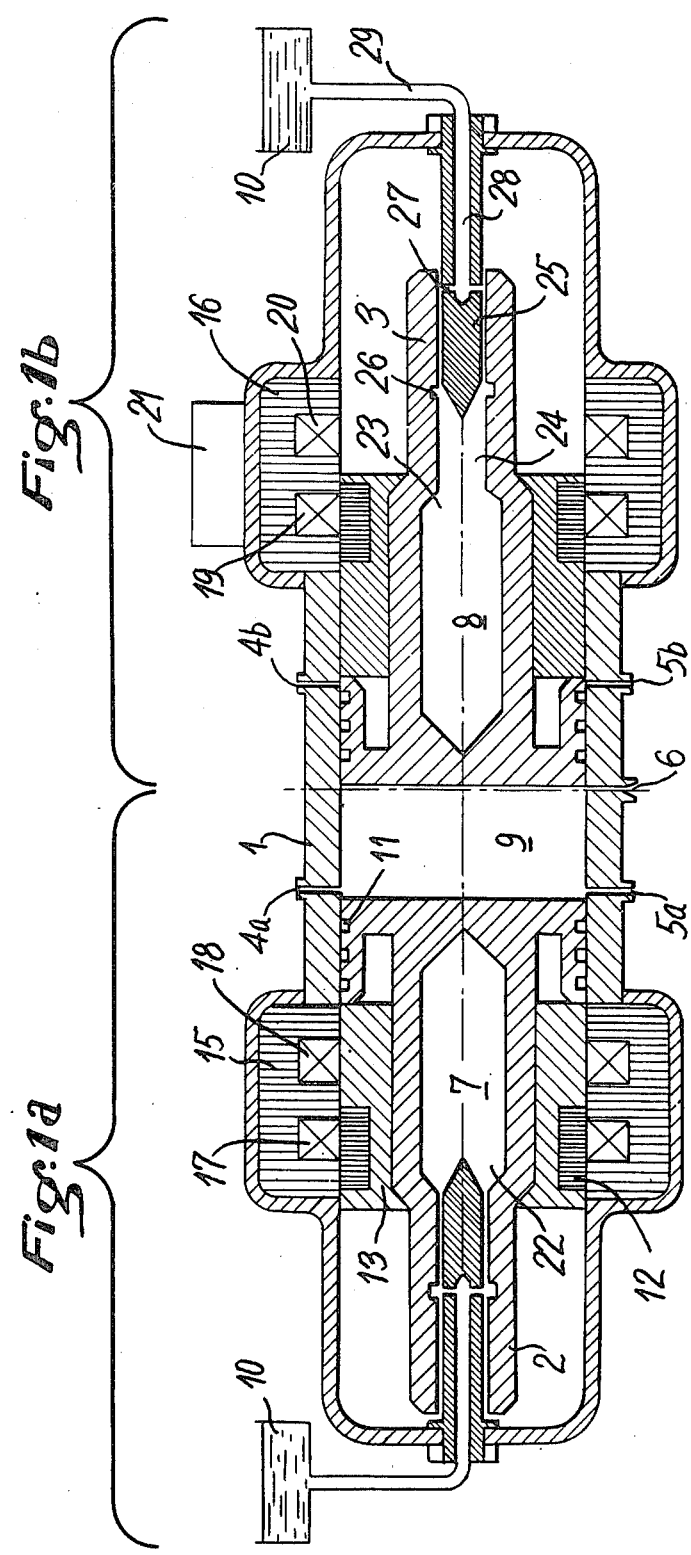

HYDRAULIC INERTIA FILLED SPRING

The present invention concerns a hydraulic inertia filled spring and is more particularly used for the return stroke of the symmetrical mobile parts of a free piston engine.

It is known that it is possible to accumulate mechanical energy by compression of a liquid. The variation of volume of the liquid is generally within the range of $10^{-5}$ to $10^{-4}$ per bar. The enery thus stored, and then restored, is economically interesting for maximum pressures between $10^2$ and $10^4$ bars.

Thus a light oil (specific gravity 0.8, e.g.) can have its volume reduced by 6% under action of a pressure of 1000 bars, the energy stored by the compression of the oil being then 3750 joules for 1 kg of compressed oil, while for 1 kg of steel working at 50 kg to a square millimeter the stored energy is only 160 joules.

A hydraulic spring is generally composed of a casing made of a strong material able to resist to the pressure of the liquid contained therein, and a piston which penetrates into the casing while reducing the volume of the liquid.

However, the use of a liquid compression spring is limited due to the fact that a leak of the compressed liquid is nearly unavoidable under high pressure, particularly if there is desired to prevent the solid rubbings which are energy dissipating and which would be unavoidably produced by an efficacious tightness system. The use of liquid compression springs is therefore mainly recommended for springs with very short compression durations enabling a re-supplying of the lost liquid. For example, it is possible to provide a so-called free piston engine with such a liquid compression spring for returning the symmetrical moving parts of the engine.

Moreover, the re-supplying of the liquid sets difficult problems since, on the one hand, only a very short time is provided therefor and, on the other hand, the filling with liquid must generally be made in such a manner that the stroke of the spring be maintained substantially constant and particularly so that the outer dead center of the moving parts be fixedly positioned independently of variations in the speed and in the load.

The presently used solutions are costly and complicated; for example the position of the outer dead center is electromagnetically detected and the volume of liquid introduced in the spring is servoed, by means of electronically controlled pumps and electrovalves, to the difference between the measured position and the desired position of the outer dead center, which is rather complicated to set in use.

The present invention has for its object a far more simple solution of the problem caused by filling hydraulic springs with liquid for compensating the leak. It principally consists in using the strong accelerations which the moving parts are subjected to at the vicinity of the inner dead center (at the moment of re-supplying the liquid spring) to drain a so-called "vacuum chamber" cavity which moves with the moving part, this cavity being then supplied in liquid at the vicinity of the outer dead center.

According to the invention, the inertia filled spring particularly for alternating machines comprises a fixed part with a free end, a moving part, means for displacing the moving part with respect to the fixed part between a position of outer dead center and a position of inner dead center, the fixed part being innerly provided on at least a portion of its length with an axial bore, a reservoir of liquid communicating with said axial bore, said axial bore having at least one outlet aperture, the moving part being filled with the same liquid as the reservoir and surrounding the fixed part on a portion of its length, the portion of the moving part surrounding the fixed part having an inside recess, the inside recess of the moving part being substantially in front of the outlet aperture of the fixed part at the position of outer dead center and substantially in front of the free end of the fixed part at the position of inner dead center.

According to another feature of the invention, the inertia filled spring comprises a casing movable within a machine between a position of inner dead center and a position of outer dead center and insidely delimiting an inner chamber and a channel, a liquid in said casing, a piston fixedly mounted on the machine and positioned in the channel of the movable casing to penetrate into the liquid of the casing for compressing said liquid in the course of the movement of the movable casing to the position of outer dead center, the piston having an axial bore and at least one outlet insidely communicating with said axial bore, a recess formed into the channel of the casing, said recess being provided to be just in front of the piston when the casing is at the position of inner dead center and to be just in front of the outlet of the piston when the casing is at the position of outer dead center, a tube connected to a liquid reservoir and communicating with the axial bore of the piston, said recess being put into communication with the liquid when the movable casing is at the vicinity of the position of inner dead center when the liquid is submitted to an acceleration causing draining of the recess which is then at a pressure lower than atmospheric pressure, said recess being then isolated from the liquid when the movable casing returns to the position of outer dead center and being closed by the piston, whereby the piston compresses the liquid of which the pressure raises while the closed recess remains at a lower pressure, the recess being in front of the outlet of the piston at the vicinity of the position of outer dead center and whereby in relation with the tube and sucking-in a quantity of liquid compensating for leaks of liquid within said casing and enabling to maintain the outer dead center at a substantially constant position.

Various other features of the invention are moreover shown in the following detailed disclosure.

An embodiment of the object of the invention is shown as a non-limitative example in the accompanying drawing, in which:

FIGS. 1a and 1b are each a half elevation cross-section of a free piston machine embodying the inertia filled hydraulic spring of the present invention.

Referring now to the drawing, a free piston machine has been shown with only one heat cylinder 1 in which are moving two parts 2 and 3. The heat cylinder 1 has inlet apertures 4a and 4b, outlet apertures 5a and 5b as well as a central nozzle 6. The moving parts 2 and 3 oscillate symmetrically between, on the one hand, an outer dead center (FIG. 1a) reached when the opposite working faces of the pistons of the moving parts 2 and 3 are spaced apart along the longitudinal axis of the machine while having compressed a liquid contained in the chambers 7 and 8 of two return hydraulic springs as detailed in the following disclosure and, on the other hand, an inner dead center (FIG. 1b) reached when the opposite working faces of the pistons are at a rest at a close vicinity each other after having compressed a burning mixture introduced, particularly through the central nozzle 6, into the median variable volume chamber 9 formed between and by said working faces. Then the burning mixture burns and pushes the moving part. When the moving parts are driven to the position of outer dead center, the hydraulic spring formed by the liquid of the chambers 7 and 8 is compressed to then return the moving parts to the position of inner dead center. As this will be shown later-on there is provided a reservoir 10 for the same liquid as that of the chambers 7 and 8, the reservoir 10 compensating for the leakage of the liquid and thereby maintaining a quantity of liquid so that the position of the outer dead center of the moving part will be substantially constant.

Each of the moving parts 2, 3 is provided with tightness gaskets 11 and carries an annular magnetic mass 12' substantially without reluctance and made of laminated iron. The magnetic mass 12 is crimped in a non-magnetic material 13. In a same manner, the heat cylinder 1 carries annular inductors 15, 16 provided with coils 17, 18 and respectively 19, 20 in front of which the magnetic masses 12 will move during the alternating movement of the moving parts.

The coils 17, 18 and respectively 19, 20 of the inductors 15, 16, together with the magnetic masses 12, are used as means for starting the movement of the machine, means for tuning the displacement in phase of the moving parts 2 and 3, as well as sources for delivering an electrical energy when the machine is working. In a known manner, the whole device is energized from a means diagrammatically shown at 21, and the coils 17, 19 and respectively 19, 20 are, for example, mounted according to two sets connected in parallel.

Each of the hydraulic springs which are more particularly the subject matter of the present invention comprises a column of liquid 22 formed in a casing 23 delimiting the chambers 7, 8 mentioned above and which are part of the moving parts 2, 3. The casing 23 is extended by a cylindrical channel 24 bored into the moving parts. A piston 25 fixedly mounted on the heat cylinder 1 is positioned in the channel 24. The channel 24, in which can thus slide the piston 25 when the parts 2, 3 are moving, is provided with an annular recess 26 which is hereinafter called "vacuum chamber" and which is provided to come just in front of the piston when the moving part is at the inner dead center (FIG. 1b). Samely apertures 27 are provided in the piston 25 to register with the vacuum chamber 26 when the moving part is at the outer dead center (FIG. 1a). A bore 28, made in the piston 25 at the rear of the apertures 27, causes the apertures 27 to communicate with the reservoir 10 by means of a tube 29.

When in the course of working of the machine, the moving parts 2, 3 are projected towards the outer dead center (FIG. 1a), the liquid in the casing 23 is compressed by the hydraulic piston 25.

When the parts 2, 3 are moving between the outer dead center and the inner dead center, the vacuum chamber 26 moves between two extreme positions.

The first position of the vacuum chamber 26 corresponds to the inner dead center (FIG. 1b), a position in which the liquid column 22 of the hydraulic spring contained in the casing 23 is no longer compressed and is put into communication with the vacuum chamber 26. Thus, when the moving part is at the vicinity of the inner dead center, the vacuum chamber 26 deposits its liquid into the channel 24 under action of the acceleration of the liquid (1,000 to 2,000 m/sec$^2$) resulting from the gas pressure of the heat cylinder 1 on the piston of the moving part 3, and it then results that immediately after such deposit of the liquid into channel 24 the vacuum chamber 26 is at a pressure lower than the pressure prevailing outside the machine (the atmospheric pressure).

The second position of the vacuum chamber 26 corresponds to the outer dead center (FIG. 1a) to which the moving part returns while closing the vacuum chamber 26 which remains at a lower pressure while the pressure raises in the liquid column 22 due to compression thereof. When the moving part reaches the outer dead center, the vacuum chamber 26 faces and uncovers the apertures 27 in the piston 25, and the chamber 26 is thus put into communication with the liquid reservoir 10 through the apertures 27, the bore 28 and the tube 29.

Due to the lower pressure previously created and still prevailing in the vacuum chamber 26, the chamber 26 sucks therein a certain amount of liquid from the reservoir 10, and this amount of liquid will be then sent to the casing 23 when the moving part reaches the inner dead center position whereby the chamber 26 then deposits its liquid as explained above.

It then appears that the inertia of the liquid column 22 enables the vacuum chamber 26 to work as a sucking-in piston which adjusts the quantity of sucked liquid in such a manner that the outer dead center be maintained substantially at the same position despite variations in the speed of the moving parts 2, 3 resulting from variations in the load and frequency and which tend to cause leak of the liquid.

Because of the arrangement of the invention the cavitation phenomena are also reduced to a minimum, said cavitation phenomena resulting from the lower pressure which is generally necessary in the casing of liquid compression springs. Actually the working of the above mentioned springs has for its result to maintain the casing 23 always full of liquid.

The hydraulic inertia filled springs according to the invention constitute, for the moving parts of a free piston machine, a return device which is far more simple and economical than the devices conventionally used, and said return springs enable to lower the hydraulic losses as well as the energy losses resulting from cavitation phenomena.

The invention is not restricted to the embodiment shown and described in detail since various modifications thereof can be applied thereto without departing from the scope of the invention as shown in the appended claims.

I claim:

1. Hydraulic inertia filled springs particularly for alternating machines, comprising a fixed part with a free end, a moving part, means for displacing the moving part with respect to the fixed part between a position of outer dead center and a position of inner dead center, the fixed part being innerly provided on at least a portion of its length with an axial bore, a reservoir of liquid communicating with said axial bore, the axial bore having at least one outlet aperture, the moving part being filled with the same liquid as the reservoir and surrounding the fixed part on a portion of its length, the portion of the moving part surrounding the fixed part having an inside recess, the inside recess of the moving part being substantially in front of the outlet aperture of the fixed part at the position of outer dead center and substantially in front of the free end of the fixed part at the position of inner dead center.

2. Hydraulic spring according to claim 1, wherein the recess insidely formed in the moving part is an annular recess made in a channel of the moving part in which slides the fixed part.

3. Hydraulic spring according to claim 1, wherein the moving part belongs to a free piston machine.

4. Hydraulic inertia filled spring for alternating machines, comprising a casing (23) movable within the machine between a position of inner dead center and a position of outer dead center and insidely delimiting an inner chamber (22) and a channel (24), a liquid in said casing, a piston (25) fixedly mounted on the machine and positioned in the channel of the movable casing to penetrate into the liquid of the casing for compressing said liquid in the course of the movement of the movable casing to the position of outer dead center, the piston (25) having an axial bore (28) and at least one outlet (27) insidely communicating with said axial bore, a recess (26) formed into the channel (24) of the casing, said recess being provided to be just in front of the piston when the casing is at the position of inner dead center and to be just in front of the outlet (27) of the piston when the casing is at the position of outer dead center, a tube (29) connected to a liquid reservoir (10) and communicating with the axial bore (28) of the piston, said recess being put into communication with the liquid when the movable casing is at the vicinity of the position of inner dead center when the liquid is submitted to an acceleration causing draining of the recess which is then at a pressure lower than atmospheric pressure, said recess being then isolated from the liquid when the movable casing returns to the position of outer dead center and being closed by the piston, whereby the piston (25) compresses the liquid of which the pressure raises while the closed recess remains at a lower pressure, the recess (26) being in front of the outlet (27) of the piston at the vicinity of the position of outer dead center and whereby in relation with the tube (29) and sucking-in a quantity of liquid compensating for leaks of liquid within said casing and enabling to maintain the outer dead center at a substantially constant position.

5. Hydraulic spring according to claim 4, wherein the recess (26) is an annular recess provided in the channel (24) in which the piston slides.

6. Hydraulic spring according to claim 4, wherein the casing (23) belongs to a moving part of a free piston machine.

* * * * *